United States Patent
Blattry et al.

[15] 3,704,022
[45] Nov. 28, 1972

[54] CHUCK FOR TURNING MACHINES

[72] Inventors: Johann Blattry, Buderich; Heinrich Beckers, Dulken, both of Germany

[73] Assignee: Paul Forkardt Kommanditgesellschaft, Dusseldorf, Germany

[22] Filed: May 27, 1971

[21] Appl. No.: 147,471

[30] Foreign Application Priority Data

May 29, 1970 Germany..........P 20 26 208.2

[52] U.S. Cl....................................279/121, 279/110
[51] Int. Cl. ...........................................B23b 31/16
[58] Field of Search...............279/112, 110, 114, 121

[56] References Cited

UNITED STATES PATENTS 1,594,716    8/1926    Forkardt....................279/114
2,602,673    8/1952    Deuring et al. .........279/121 X Primary Examiner—Francis S. Husar
Attorney—Walter Becker

[57] ABSTRACT

The specification discloses a chuck having radially moveable jaws and driving means for the jaws which disengage from the jaws in outer positions of the jaws. Each jaw has associated therewith a holding member which is engaged with the jaw and moves therewith and prevent the jaws from coming out of the chuck body when disengaged from the driving means. Each holding member is releasable from its jaw by radially inward movement of the jaw and holding member while the jaw is disengaged from the driving means.

11 Claims, 8 Drawing Figures

PATENTED NOV 28 1972

3,704,022

INVENTORS:
Johann Blättry
Heinrich Beckers
BY

CHUCK FOR TURNING MACHINES

The present invention relates to a chuck for turning machines with radially movable clamping jaws adapted to be disengaged from the driving means when occupying an end position so as to be removable from the chuck body.

With heretofore known chucks in which the clamping jaws are removable from the chuck body, for instance, for purposes of exchanging them other clamping jaws, it is possible for purposes of separating the clamping jaws from the driving means to extend the movement of the driving means beyond the working stroke necessary for disengagement or clamping by an additional distance. As soon as the driving means has moved by a distance equaling this said additional distance, it is in disengagement with the clamping jaws so that the latter can be removed radially from the chuck body and can be replaced by other clamping jaws. This exchange is necessary particularly when jaw sets are employed which are designed for certain workpieces.

Various types of chucks are known from which the clamping jaws can be removed radially out of the guiding grooves of the chuck body, as soon as the driving means have moved over an additional distance beyond the working stroke, for disengagement or tightening the clamping jaws. According to one embodiment, a so-called plain spiral chuck is employed in which the individual windings of the plain spiral for driving the clamping jaws are not in a continuous manner arranged one behind the other, but are located in spaced relationship to each other in such a way that in a certain position of the plain spiral, the clamping jaws can be radially withdrawn through the recesses between the individual plain spirals. According to another embodiment of a chuck according to the invention, a so-called rack chuck is employed in which wedge blocks extending either tangentially with the axis of rotation of the chuck or wedge blocks in axis parallel relationship to said chuck are provided with inclined teeth meshing with corresponding teeth of the clamping jaws. For purposes of removing the clamping jaws, the latter are additionally displaceable in such a way that their teeth will not engage the teeth of the pertaining clamping jaw so that the clamping jaws can be taken out radially from the chuck body.

With this heretofore known type of chuck bodies for rotary machines, there exists the danger that the clamping jaws when disengaging the driving means may fly out of the chuck body if the operator, in contrast to the directions, starts rotation of the spindle supporting the chuck. In this was dangerous accidents may occur. While optical means provided for indicating the situation, and drawing the attention of the operator to the fact that the clamping jaws disengage the driving means, the said warning devices alone cannot eliminate accidents of the above mentioned type.

In order to assure a positive holding and arresting of the clamping jaws separated from the driving means, it has been suggested to associate with each clamping jaw a holding pin displaceable in the chuck body. This pin is adapted in view of the movement of the driving member on the additional path to be displaced into the path of the clamping jaw transverse to the direction of movement thereof. If desired, the said pin is adapted for purposes of advancement to be freed by a spring. Furthermore, the said pin is adapted by a return movement of the driving means into the path section serving for chucking and disengagement to be withdrawn from the engagement with the clamping jaw, or for purposes of withdrawing is adapted to be released by a spring. Each holding pin has a locking element associated therewith which for purposes of withdrawing the holding pin from engagement with the clamping jaw may be actuated manually.

Although with this suggestion a chuck has been created for turning machines in which the clamping jaws are safely held in the position separated from the driving member, this suggestion still has some drawbacks. One drawback consists in that the holding pin has to be brought into position in which the holding pin on the additional path protruding beyond the working stroke has to be brought into engagement with the clamping jaw while the danger exists that this engagement will not be effected due to the fact that, for instance, the holding pin does not reach the recess in the clamping jaw provided therefor. On the other hand, the structural design of the above mentioned suggestion is relatively complicated and free from disturbances.

It is, therefore, an object of the present invention to provide a chuck for turning machines with radially movable clamping jaws which in one end position disengageable so as to permit the removal of said clamping jaws from the chuck while the clamping jaws in each position of the chuck are secured by holding member against flying out in view of centrifugal force. The holding member may merely in that position of the clamping jaws in which it is separated from the driving member manually and intentionally be disengaged from the respective clamping jaw.

These and other objects and advantages of the invention will appear more clearly from the following specification, in connection with the accompanying drawings, in which.

Figure 1:
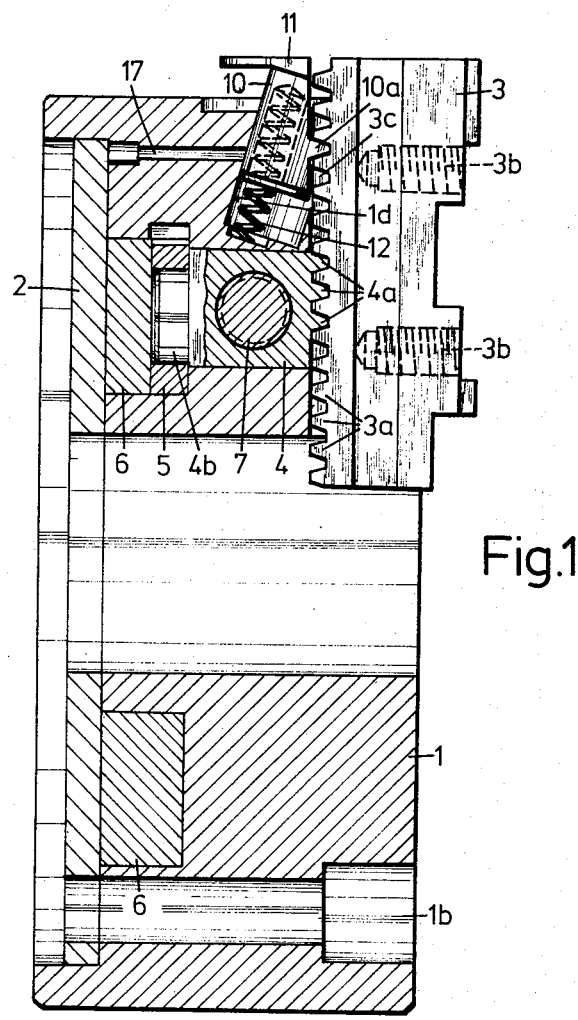
FIG. 1 is a longitudinal section through a first embodiment of a chuck according to the invention.
Figure 2:
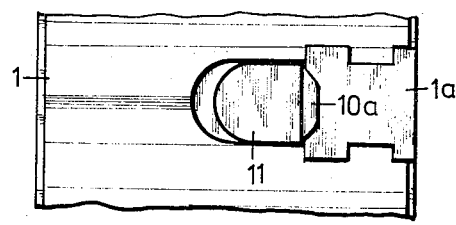
FIG. 2 is a top view of the chuck of FIG. 1 within the range of the guiding means for one jaw.

The chuck according to the present invention in which for purposes of removing the clamping jaws from the chuck body the movement of the driving means is adapted to be extended by an additional distance beyond the stroke necessary for disengagement or clamping and in which for each clamping jaw in the chuck body there is provided a holding member which engages a recess, for instance, tooth spaces of gear means and engages the respective clamping jaw and holds the same fast in the chuck body after separation from the driving means is characterized primarily in that the holding means has a protrusion by means of which over the entire working stroke of the clamping jaw it engages the recess (such as gear tooth spaces), and in its end position corresponding to the outermost position of the clamping jaw is held by engaging with the chuck body 1, and during a movement of the clamping jaw separated from the driving means is movable beyond the innermost position obtainable by the driving means out of the recess in the clamping jaw. The holding means is, in conformity with the invention, movably mounted in the chuck body in such a way that the protrusion is movable over a path which over the working stroke of the clamping jaw approximately coincides with the path of movement of the recess, and in which with an inwardly directed movement of the clamping jaw separated from the driving means beyond the working stroke deviates from the path of movement of the recess. In this way, a holding member is provided which continuously engages the recess, for instance, a tooth space of gear means and located in the clamping jaw so that an absolute safety against a flying out of the clamping jaw is obtained even when the interengaging parts of clamping jaw and driving member break within the region of the working stroke. In view of the continuous meshing of the holding member also within the region of the working stroke, the danger no longer exists that the engagement to be effected at a certain point between the holding member and the clamping jaw will not take place at all or only incompletely view of a non-favorable position of these two parts. Inasmuch as the holding means is taken along by the clamping jaw over the entire working stroke, it can be designed in a simple manner so that also a considerable structural simplification of the safety device will be obtained.

According to a further development of the invention, it is suggested for a preferred embodiment of the invention to design the holding member in the manner of a wedge and to guide the holding member along an inclined surface of the chuck body. With this embodiment, the wedge-shaped holding member will in a certain radial position of the clamping jaw automatically bring about a holding of the clamping jaw so that in addition to the wedge-shaped holding member no additional parts are necessary. It is merely necessary to provide in the chuck body a guiding surface which corresponds to the wedge angle of the holding member. In order to facilitate an actuation of the holding member for disengaging the same from the clamping jaw, the holding member may be provided with a push plate which increases the pressing surface protruding from the chuck body.

According to a second preferred embodiment of the invention it is suggested to design the holding means as a lever mounted in the chuck body. The tilting movement of the lever toward the outside is, by engagement with the chuck body, limited in a position parallel to the axis of rotation of the chuck. For purposes of actuating said lever to effect the separation from the clamping jaw, according to a further feature of the invention, a radial bore of the chuck body there is guided a control pin which positively engages the central portion of the lever, said control pin having one end protrude from the chuck body.

Whereas with the first mentioned preferred embodiment for the protrusion there was obtained a path extending at an acute angle with regard to the path of movement of the recess, said protrusion engaging the clamping jaw, with the second embodiment there is obtained a circular-shaped path for the protrusion which path in the outermost position of the lever leads tangentially into the path of movement of the recess. Thus, with both embodiments it will be assured that the protrusion of the holding member will, over the entire working stroke be in engagement with the clamping jaw, but that with a movement of the clamping jaw separated from the driving means beyond the innermost position obtainable by the driving means, it is possible to pull the protrusion out of the clamping jaw inasmuch as the path of movement of the protrusion on the holding member and the recess in the clamping jaw on this additional path section differ from each other. With both embodiments it is therefore necessary to press the clamping jaw as well as the holding member manually inwardly into the chuck body in order to obtain a separation of the clamping jaw also from the holding member. By this arrangement an undesired or accidental disengagement of the safety means against a flying out or throw out of the clamping jaws will be prevented.

The lever acting as holding member may, according to a further feature of the invention, have that end thereof which is journalled in the chuck body designed so as to form a ball, and its central portion may be provided with a ball-shaped reinforcement in order to permit a favorable transfer of power while being properly guided. By means of a safety pin arranged radially in the chuck body and engaging between the ball-shaped end and the ball-shaped reinforcement, the lever can be safely guarded against dropping out when the clamping jaw has been removed.

The invention also suggests to load the holding member either directly or indirectly with the interposition of the control pin by a radially outwardly acting pressure spring in order after each new setting or new introduction of the pertaining clamping jaw to move the same into such a position that it will assure an engagement of the rack teeth or inclined teeth. When the holding member in under indirect load by the pressure spring, the latter may be arranged in a bore of the control pin.

Referring now to the drawings in detail, with both embodiments of the chuck according to the present invention, three master jaws 3 are radially displaceably guided in radial slots 1a of the chuck body 1, and non-illustrated auxiliary jaws can respectively be connected by cross offset to said jaws 3. For purposes of connecting the auxiliary jaw to the respective master jaw 3, each of the master jaws 3 is provided with threaded bores 3b. Behind each master jaw 3, a wedge block 4 is displaceably guided in a tangential groove of the chuck body 1 in a direction transverse to the pertaining master jaw 3. Each wedge block 4 has a portion of that surface thereof which faces the pertaining master jaw 3, inclined teeth 4a which fit into tooth spaces 3c of teeth 3a at the back side of each master jaw 3.

Each wedge block 4 has its back side provided with a cylindrical boss 4b which is parallel to the axis of rotation of the chuck. Journalled on the boss 4b is a slide block 5 which is guided in a radial groove 6a of a transmission ring 6 rotatably and coaxially journalled in the chuck body 1. These elements of a wedge block chuck known per se, are held in the chuck body 1 by a cover 2.

Figure 4:
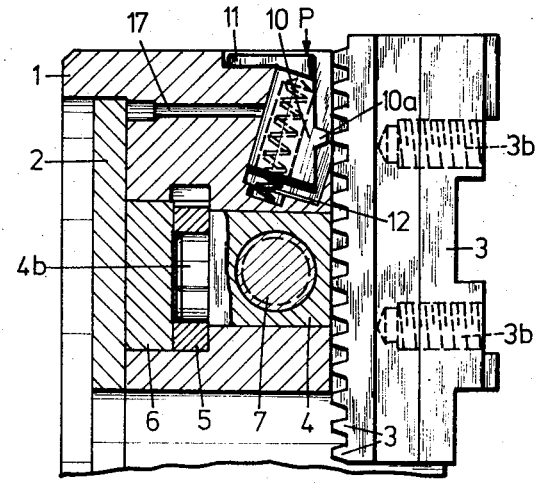
FIG. 4 shows a longitudinal section similar to the upper portion of FIG. 1, in which a centripetally directed pressing force is exerted upon the holding means.
Figure 3:
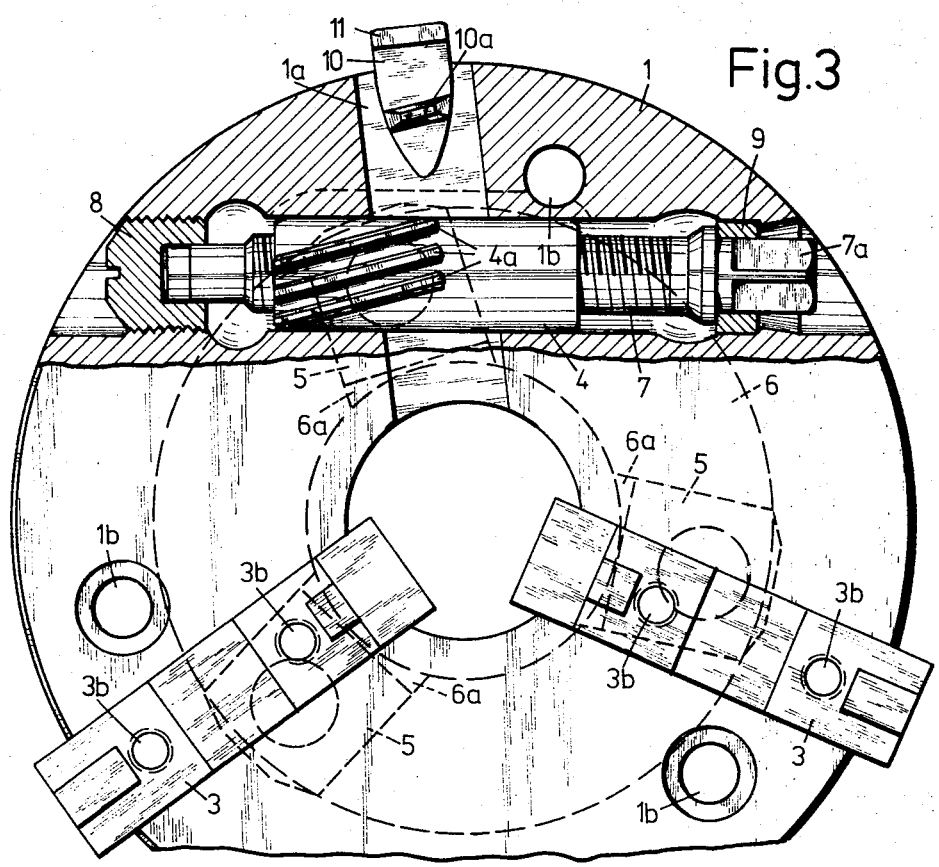
FIG. 3 illustrates on a larger scale than FIG. 1, a front view of a chuck with the upper portion illustrated in section.
Figure 8:
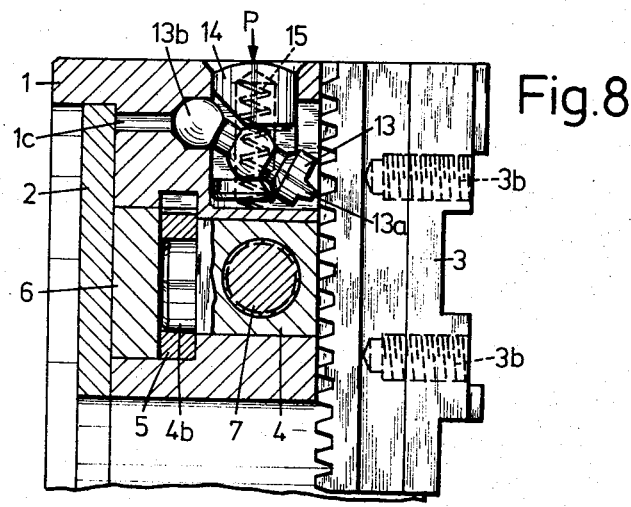
FIG. 8 is a longitudinal section similar to that of FIG. 5 through the upper portion of the chuck while a centripetally directed pressing force is exerted upon the holding member.
Figure 7:
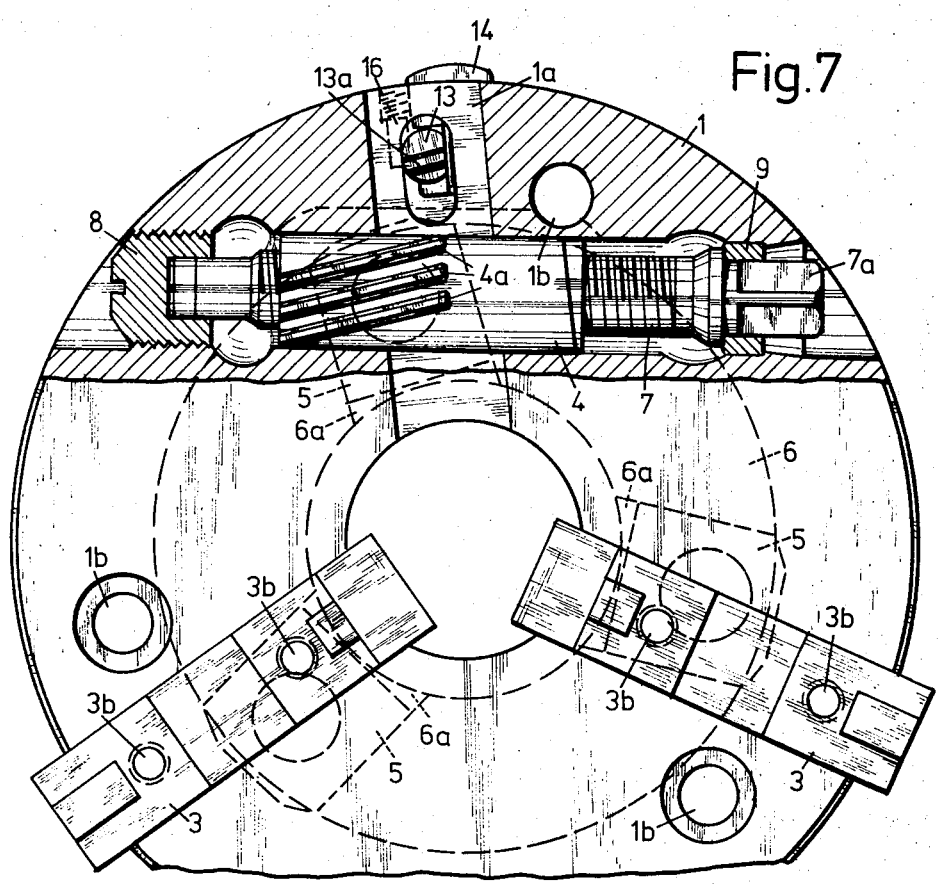
FIG. 7 is a front view of the chuck according to FIGS. 5 and 6 with the upper portion shown in section.

The wedge block 4 which is shown in the section portion of FIGS. 3 and 7 is driven directly by an operating screw or threaded spindle 7 which by means of a thrust plug 8 and a thrust ring 9 is journalled in the chuck body 1. By turning the threaded spindle 7 by means of a wrench engaging the square 7a, the wedge block 4 is displaced in its tangential guiding means. By means of boss 4b arranged on wedge block 4 and by means of the pertaining slide block 5, the directly driven wedge block 4 takes along the transmission ring 6 which in this way by means of the two other slide blocks 5 and bosses 4b takes along the two remaining wedge blocks 4 which in this way are driven directly. The working stroke of the manually actuated chuck for chucking or releasing a workpiece by means of the clamping jaws is determined by the length of the inclined teeth 4a of the wedge block 4. When the wedge block 4 driven directly by the threaded spindle, and thus also the two other wedge blocks 4 are displaced beyond their working stroke by an additional distance, the inclined teeth leave the respective teeth 3a of the master jaws 3 as illustrated in FIGS. 4 and 8. In this position, the wedge blocks 4 acting as driving elements are separated from the master jaws 3 so that the latter can be manually displaced in their radial slots independently of the wedge blocks 4.

With the first embodiment illustrated FIGS. 1 – 4, a wedge-shaped locking member 10 is arranged in the chuck body 1 behind each master jaw 3. This locking element 10 is guided on an inclined surface 1d of the chuck body 1 which inclined surface corresponds to the wedge angle. Moreover, the said element 10 is provided with a projection 10a forming a tooth which in conformity with FIG. 1 over the entire working stroke of the master jaw 3 engages a tooth space 3c of the teeth 3a. That end of the member 10 which protrudes from the jaw body 1 is provided with a push plate 11. The locking element 10 is continuously acted upon by the radially outwardly directed force of a compression spring 12. When a master jaw 3 moves within its working stroke, the wedge-shaped locking element is taken along continuously inasmuch as its projection 10a remains in the tooth space 3c of the master jaw 3. The projection 10a moves on a path which extends at an acute angle with regard to the path of movement of the tooth space 3c. The projection 10a can be pulled out of the tooth space 3c only when the wedge block 4 has moved over the additional distance beyond the working stroke. In this position, the teeth 4a of the wedge block have disengaged the teeth 3a of the master jaw 3 so that the latter can be manually moved beyond the innermost position which can be reached by the wedge block 4, while the path of the projection 10a moves away from the path of movement of the tooth space 3c to such an extent that the projection 10a is able to disengage the tooth space 3c. When in this innermost position of the master jaw 3 and the locking element 10, the latter is held stationary by a pressure exerted on the push plate 11, the master jaw 3 can be pulled outwardly as shown in FIG. 4.

For purposes of introducing a new master jaw 3 it is merely necessary to press downwardly the locking element 10 against the thrust of the compression spring 12 and to introduce the master jaw 3. In the desired position, the element 10 is then released whereupon its projection 10a engages the corresponding tooth space 3c. As a result thereof, the projection 10a of the locking element 10 simultaneously carries out a centering action to center the newly introduced master jaw 3 for engagement by the wedge block 4 as soon as the latter has been returned beyond the additional distance and enters into the region of the working stroke.

According to the second embodiment of the invention illustrated in FIGS. 4 to 8, a lever 13 journalled in the chuck body 1 is employed as locking element. Lever 13 is likewise provided with a projection 13a for engagement with a tooth space 3c of the teeth 3a. The journalling of lever 11 is effected by means of a ball-shaped end 13b journalled in a corresponding recess in the chuck body 1. The pivoting movement of the lever 13 is in its outermost position limited by its engagement with the chuck body 1 while lever 13 in this position is parallel to the axis of rotation of the chuck body.

The dimensions of lever 13 are so selected that the projection 13a moving on a circular-shaped path will over the entire working stroke of the master jaw 3 remain in one of the two spaces 3c. Only when the master jaw 3 after having disengaged the wedge block 4 is manually displaced beyond the working stroke, will the projection 13a of lever 13 move out of the tooth space 3c.

In order to be able to maintain lever 13 in this position, a control pin 14 is arranged in a radial bore 1e (FIG. 6) of the chuck body 1. Control pin 14 positively engages the central portion of lever 13. To this end, lever 13 is provided with a ball-shaped thickened portion 13c. In a bore 14a of the control pin 14 there is arranged a radially outwardly acting compression spring 15 which in this way directly acts upon the lever 13 acting upon the locking element 10.

By depressing control pin 14, it will be appreciated that when the master jaw 3 is displaced inwardly beyond the working stroke, the projection 13a of lever 13 can disengage the tooth space 3c so that the master jaw 3 can be pulled out of the chuck body 1. Lever 13 acts similar to the locking member 10 described in connection with the first embodiment and likewise carries out a holding and centering function when inserting new master jaws 3. In order to make sure that lever 13 cannot drop out of chuck body 1 when the master jaw 3 has been removed, there is provided a safety or holding pin 16 between the ball-shaped end 13b and the ball-shaped reinforcement 13c of lever 13. Pin 16 is radially inserted into the chuck body 1 and is clearly shown in FIGS. 6 and 7.

Figure 5:
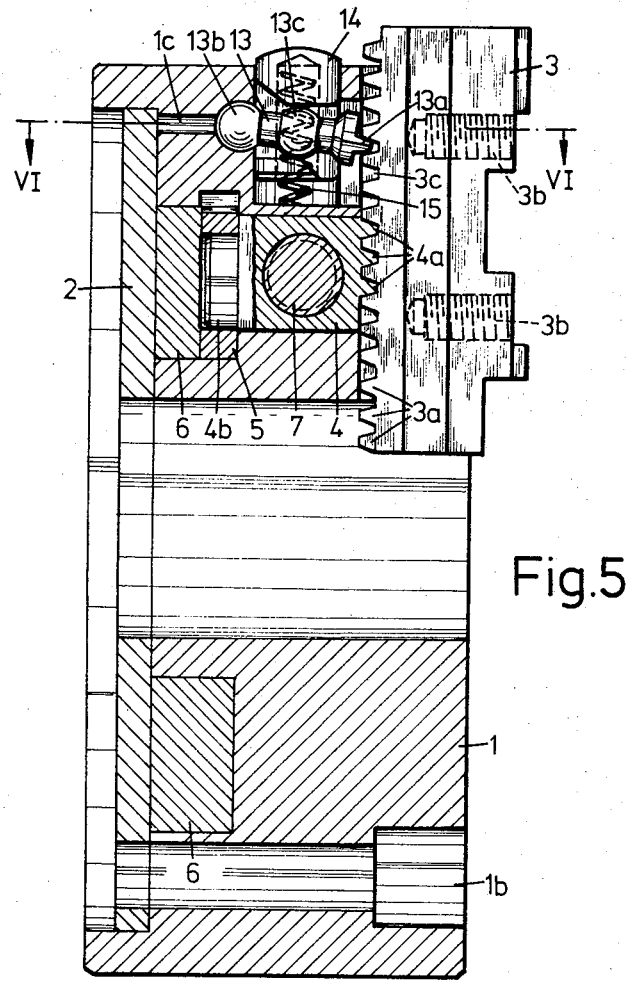
FIG. 5 shows a longitudinal section similar to FIG. 1 through a second embodiment of a chuck according to the invention.
Figure 6:
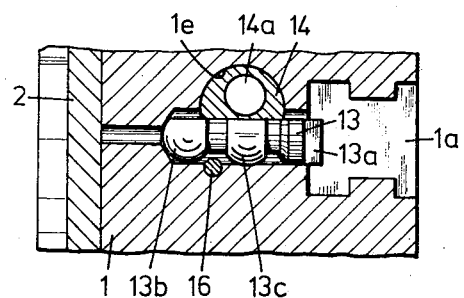
FIG. 6 is a section taken along the line VI—VI of FIG. 5 with the clamping jaw removed.

It may be mentioned that FIGS. 1 and 4 also show an abutment pin 17 which engages a longitudinal groove of the locking element 10, (said longitudinal groove not extending all the way through), and brings about that said locking element 10, after the jaw 3 has been removed cannot be moved outwardly further than necessary by compression spring 12, and also brings about that after reinsertion of the master jaw 3, the latter will by compression spring 12 be moved into the correct position for the introduction of the inclined teeth. FIGS. 5 and 8 show at the same spot an auxiliary bore 1c through which during the disassembly of the chuck, the lever 13 can be expelled. Finally, the drawing shows bores 1b in chuck body 1 through which bores the chuck can by means of corresponding connecting screws be connected to the spindle of the turning machine.

It is, of course, to be understood that the present invention is, by no means limited to the particular showing in the drawings, but also comprises any modifications within the scope of the appended claims.

What is claimed is:

1. A rotary chuck comprising: a body, jaws substantially radially moveable in said body, jaw driving means in said body for moving said jaws radially to clamp and unclamp a workpiece in the chuck, said jaw driving means disengaging from said jaws in predetermined outer positions of the jaws radially outwardly from an extreme outer working position thereof, and holding means in the chuck body having positive engagement with each said jaw and moveable therewith over the working range of the said jaws, said holding means preventing further radially outward movement of said jaws following disengagement of said jaw driving means therefrom but being disengageable from the respective jaws in response to radially inward movement of the jaws to a position radially inward from the extreme inner working position thereof.

2. A rotary chuck according to claim 1 in which said jaws are provided with driving teeth, said jaw driving means having teeth engaging the teeth on said jaws, said holding means comprising a holding member for each jaw, each holding member having at least one projection engaging a tooth space of the respective jaw, each holding member having a radially outer stopped position in which the projection thereon is engaged with a tooth space of the respective jaw and a radially inner position in which the projection thereon is disengaged from the teeth of the respective jaw.

3. A rotary chuck according to claim 2 in which each holding member is guided for movement in the chuck body which is inclined to the axis of the chuck body.

4. A rotary chuck according to claim 3 in which each holding member includes an outer end portion accessible from outside the chuck body.

5. A rotary chuck according to claim 2 in which each holding member is in the form of a lever extending axially of said chuck body in the plane of the respective jaw and having said projection on the end thereof nearest the respective jaw and having the end remote from the respective jaw pivotally connected to the chuck body for swinging movement in the chuck body in the plane in which the respective jaw moves.

6. A rotary chuck according to claim 5 in which each lever in the said radially outer stopped position is about parallel to the axis of the chuck body.

7. A rotary chuck according to claim 5 which includes a control plunger radially moveable in the chuck body adjacent each lever, each plunger being coupled to the adjacent lever between the ends of the lever and having an outer end portion accessible from outside the chuck body.

8. A rotary chuck according to claim 7 in which the end of each lever which is pivotally connected to said chuck body and the region of engagement of each lever with the respective plunger comprise ball shaped portions.

9. A rotary chuck according to claim 7 which includes radial pin means in said chuck body adjacent each lever permitting pivotal movement of the respective lever but being disposed between said ball shaped portions and preventing the respective lever from dropping out of said chuck body.

10. A rotary chuck according to claim 1 in which each said holding means is spring biased in the radially outward direction.

11. A rotary chuck according to claim 7 in which each said plunger has a bore extending into the radially inner end thereof, and a compression spring in each said bore biasing the respective plunger in the radially outward direction.

* * * * *